United States Patent [19]

Foster

[11] Patent Number: 5,445,351

[45] Date of Patent: Aug. 29, 1995

[54] COVER FOR A FUEL TANK SUPPORT STRAP

[75] Inventor: Larry Foster, Chelsea, Mich.

[73] Assignee: Pilot Industries, Inc., Dexter, Mich.

[21] Appl. No.: 199,046

[22] Filed: Feb. 17, 1994

[51] Int. Cl.⁶ ............................................. A47B 95/00
[52] U.S. Cl. .................................. 248/345.1; 280/834
[58] Field of Search .................... 248/503, 505, 345.1,
248/220.2, 345; 24/462, 587; 280/833, 834, 835

[56] References Cited

U.S. PATENT DOCUMENTS

| | | | |
|---|---|---|---|
| 4,318,518 | 3/1982 | Davis | 248/60 |
| 4,369,981 | 1/1983 | Chiba et al. | 280/834 |
| 4,444,373 | 4/1984 | Hayashi | 248/544 |
| 5,267,714 | 12/1993 | Nelson, II | 248/222.2 |

*Primary Examiner*—Ramon O. Ramirez
*Attorney, Agent, or Firm*—Gifford, Krass, Groh, Sprinkle, Patmore, Anderson & Citkowski

[57] ABSTRACT

A cover for an elongated fuel tank support strap is disclosed in which the cover is positioned in between the strap and the fuel tank. The cover is formed from an elongated top wall of plastic having a top which faces the gas tank, a bottom which faces and overlies the support strap and two spaced apart side walls. Each side wall includes an inwardly facing channel which entraps and lockingly engages the opposite sides of the support strap. In addition, the top wall has two longitudinally extending and laterally adjacent sections which obliquely intersect each other at a peak. Depression of the peak varies the spacing between the channels so that the cover can accommodate tank straps which vary in width within preset limits.

14 Claims, 1 Drawing Sheet

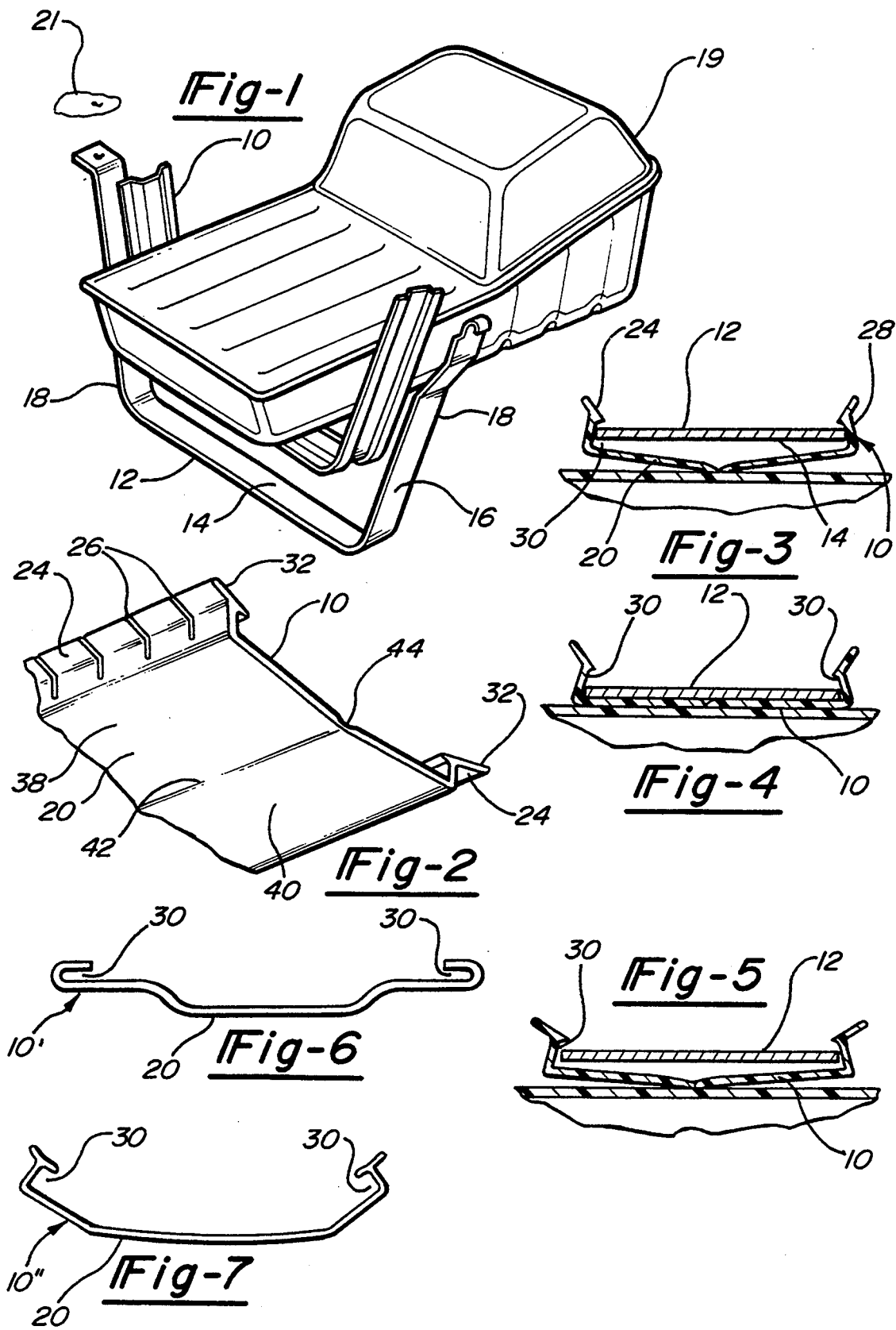

COVER FOR A FUEL TANK SUPPORT STRAP

BACKGROUND OF THE INVENTION

I. Field of the Invention

The present invention relates to a cover for a fuel tank support strap.

II. Description of the Prior Art

Typically, one or more support straps are utilized to secure a fuel tank to an automotive, vehicle. These support straps are flat, elongated and extend under the gas tank. Both ends of the support strap are then secured to the automotive vehicle frame thus supporting the fuel tank and securing it to the vehicle.

The previously known support straps for fuel tanks are typically constructed of metal for low cost and high strength construction. However, since the fuel tank also is usually constructed of metal, it is necessary to prevent direct contact between the metal strip and the fuel tank in order to avoid galvanic reaction between the support strap and the fuel tank. Such a galvanic reaction can ultimately lead to erosion of the fuel tank and fuel leakage.

Consequently, in order to prevent direct contact between the support strap and the fuel tank, it has been the previously known practice to position a mylar strip between the tank support strap and the fuel tank. This mylar strip is adhesively secured to one side of the support strap.

This previously known construction for the support strap assembly in an automotive vehicle, however, suffers from several disadvantages. One disadvantage is that the adhesive is typically applied to one side of the mylar strip and covered with a facing material. The worker then removes the facing material and applies the now exposed adhesive side of the mylar strip to the support strap. This procedure is not only labor intensive and costly, but also requires ate periodic disposal of the removed facing strips.

A still further disadvantage of these previously known strap assemblies is that, unless the mylar strip is accurately positioned over the metal support strap, a portion of the strap can still make contact with the fuel tank. Any such contact can result in a galvanic reaction between the strap and the fuel tank and result in corrosion of the fuel tank.

SUMMARY OF THE INVENTION

The present invention provides a cover for a fuel tank support strap which overcomes all the above mentioned disadvantages of the previously known devices.

In brief, the cover of the present invention comprises an elongated strip constructed of a flexible, non-metallic material. Preferably, the strip is constructed from extruded plastic and has a top, a bottom and two spaced apart and parallel sides. The strip, furthermore, is dimensioned so that the strip bottom overlies the top of the fuel tank strap and, in doing so, the sides of the strip extend along the sides of the fuel tank support strap.

An inwardly facing channel is formed along each side of the strip and this channel lockingly engages the adjacent side of the fuel tank strap thereby securing the non-metallic strip to the fuel tank support strap.

Preferably, the top of the strip is constructed from two longitudinally extending sections which obliquely intersect each other at a peak. Flexing the peak varies the spacing between the channels somewhat to allow the strip to be attached to support straps of different widths.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is an elevational view illustrating a preferred embodiment of the present invention;

FIG. 2 is a fragmentory elevational view illustrating a portion of the preferred embodiment of the invention;

FIG. 3 is a cross sectional view illustrating a preferred embodiment of the present invention;

FIGS. 4 and 5 are views similar to FIG. 2 and illustrating the operation of the preferred embodiment of the present invention;

FIGS. 6 and 7 are views similar to FIG. 2 but illustrating a second and third embodiment thereof.

DETAILED DESCRIPTION OF PREFERRED EMBODIMENTS OF THE PRESENT INVENTION

With reference first to FIG. 1, a preferred embodiment of the cover 10 for a fuel tank support strap 12 is thereshown. The fuel tank support strap 12 is conventional in nature and comprises an elongated metallic band having a top 14, bottom 16 and two spaced apart and parallel sides 18. The support strap 12 extends underneath a fuel tank 19 and is attached at each end to the automotive vehicle frame 21. In practice, the support strap 12 is not manufactured to close tolerances and, as such, different straps 12 can vary in both width and thickness on the order of several millimeters.

Referring now to FIGS. 2 and 3, the cover 10 is thereshown in greater detail and comprises an elongated top wall 20 and two spaced apart side walls 24 which extend along opposite sides of the body 20. The cover 10 is constructed from a flexible, non-metallic material, such as extruded plastic. Additionally, the strip 10 includes a plurality of longitudinally spaced and laterally extending slits 26 along each of its side walls 24 to increase the flexibility and bendability of the cover 10.

Each side wall 24 of the cover 10 includes a downwardly and inwardly extending lip 28 which forms a generally V-shaped channel 30 so that the channels 30 face each other. Additionally, as best shown in FIG. 3, the cover 10 is dimensioned so that the bottom of the top wall 20 the overlies and covers the top 14 of the support strap 12 and, in doing so, the sides 18 of the support strap 12 are lockingly entrapped within the channels 30. In this fashion, the cover 10 is attached to the support strap 12 and effectively insulates the strap 12 from the fuel tank.

Referring now especially to FIG. 2, in order to facilitate attachment of the cover 10 to the support cover 10, a downwardly and outwardly extending guide flange 32 is provided along each side wall 24 of the cover 10. These flanges 32 cooperate with the support strap 12 at the strip 10 is pushed onto the strap 12 to bend the sides 24 of the strip 10 outwardly to thereby guide the sides 18 of the strap 12 into the cover channels 30. Once the strap 12 is positioned within the channels 30, the sides 24 snap back to their original position thus entrapping the strap 12 within the channels 30 and simultaneously locking the cover 10 to the support strap 12.

As best shown in FIG. 2, the top wall 20 of the cover 10 is preferably formed from two longitudinally extending flat sections 38 and 40 which are laterally adjacent each other and obliquely intersect each other at a peak 42. Additionally, a groove 44 is positioned along a bottom 22 of the cover 10 directly underneath the peak 42. This groove 44 effectively reduces the material thickness beneath the peak 42 to facilitate bending or flexing of the top wall 20 of the cover 10 along the peak 42.

The longitudinally extending sections 38 and 40 together with the flexible peak 42 allows the cover to flex from the position shown in FIG. 3 to the positions shown in FIGS. 4 and 5. In doing so, the effective spacing between the channels 30 changes within preset limits which enables the cover to accommodate support straps 12 of different widths within the preset limits while still providing a firm locking engagement between the cover 10 and the support strap 12.

Similarly, the side walls 28 which form a portion of the channels 30 extend downwardly and inwardly and are generally planar in shape. As such, the cover 10 can be securely fastened to support straps 12 of different thicknesses as best shown in FIGS. 3 and 4.

FIGS. 6 and 7 also show second and third preferred embodiments 10' and 10'' of the present invention. In each case, however, flexing of the top wall of the cover varies the space between the inwardly facing channels 30 in order to accommodate support straps 12 having different widths.

Although the cover 10 can be constructed of any conventional material, it is preferably made from polypropylene. Polypropylene exhibits both a high and a low temperature resistance to material degradation as well as high chemical resistance.

From the foregoing, it can be seen that the present invention provides a cover for a fuel tank support strap which not only can be simply and easily attached to the support strap 12, but which is also able to accommodate support straps of varying thicknesses and varying widths.

Having described my invention, however, many modifications thereto will become apparent to those skilled in the art to which it pertains without deviation from the spirit of the invention as defined by the scope of the appended claims.

I claim:

1. A cover for an elongated fuel tank support strap, said strap having a top, a bottom and two spaced apart and parallel sides, said strap being constructed of a metallic material, said cover comprising:
   an elongated top wall constructed of a flexible, nonmetallic material, said top wall having a top, a bottom and two spaced apart and parallel sides, said top wall being dimensioned so that a bottom of said top wall overlies the top of the tank strap,
   a pair of side walls, one side wall extending outwardly from each side of said top wall,
   an inwardly facing channel formed on each side wall, each channel adapted to lockingly ,engage one side of the tank strap,
   means for varying the spacing between said channels,
   wherein said top wall comprises first and second longitudinally extending and laterally adjacent sections which obliquely intercept each other along a peak which extends longitudinally along said top wall.

2. The invention as defined in claim 1 wherein said cover is constructed of plastic.

3. The invention as defined in claim 2 wherein said cover is extruded.

4. The invention as defined in claim 1 wherein said cover is constructed of polypropylene.

5. The invention as defined in claim 1 wherein said top wall includes a longitudinally extending groove along the bottom of said top wall, said groove being aligned with said peak.

6. The invention as defined in claim 1 wherein each side wall is generally planar and extends downwardly and inwardly from said top wall.

7. The invention as defined in claim 1 wherein said cover comprises a plurality of longitudinally spaced and laterally extending slits along each side wall.

8. A cover for an elongated fuel tank support strap, said strap having a top, a bottom and two spaced apart and parallel sides, said strap being constructed of a metallic material, said cover comprising:
   an elongated top wall constructed of a flexible, nonmetallic material, said top wall having a top, a bottom and two spaced apart and parallel sides, said top wall being dimensioned so that a bottom of said top wall overlies the top of the tank strap,
   a pair of side walls, one side wall extending outwardly from each side of said top wall,
   an inwardly facing channel formed on each side wall, each channel adapted to lockingly engage one side of the tank strap,
   means for varying the spacing between said channels,
   wherein said cover comprises a plurality of longitudinally spaced and laterally extending slits along each side wall.

9. The invention as defined in claim 8 wherein said cover is constructed of polypropylene.

10. The invention as defined in claim 8 wherein said cover is constructed of plastic.

11. The invention as defined in claim 10 wherein said cover is extruded.

12. The invention as defined in claim 8 wherein said top wall comprises first and second longitudinally extending and laterally adjacent sections which obliquely intercept each other along a peak which extends longitudinally along said top wall.

13. The invention as defined in claim 12 wherein said top wall includes a longitudinally extending groove along the bottom of said top wall, said groove being aligned with said peak.

14. The invention as defined in claim 8 wherein each side wall is generally planar and extends downwardly and inwardly from said top wall.

* * * * *

UNITED STATES PATENT AND TRADEMARK OFFICE
CERTIFICATE OF CORRECTION

PATENT NO. : 5,445,351
DATED : August 29, 1995
INVENTOR(S) : Larry Foster

It is certified that error appears in the above-indentified patent and that said Letters Patent is hereby corrected as shown below:

Column 1,        line 10, after "automotive", delete ";";
                 line 38, delete "ate" and insert --the--.

Column 2,        line 58, delete "cover 10" and insert --strap 12--;
                 line 61, delete "at" and insert --as--.

Column 4,        line 2, after "lockingly" delete ",".

Signed and Sealed this

Twenty-sixth Day of December, 1995

Attest:

BRUCE LEHMAN

Attesting Officer            Commissioner of Patents and Trademarks